Sept. 27, 1938.  B. LONG  2,131,404
METHOD AND APPARATUS FOR TEMPERING GLASS
Filed April 8, 1936  3 Sheets-Sheet 1
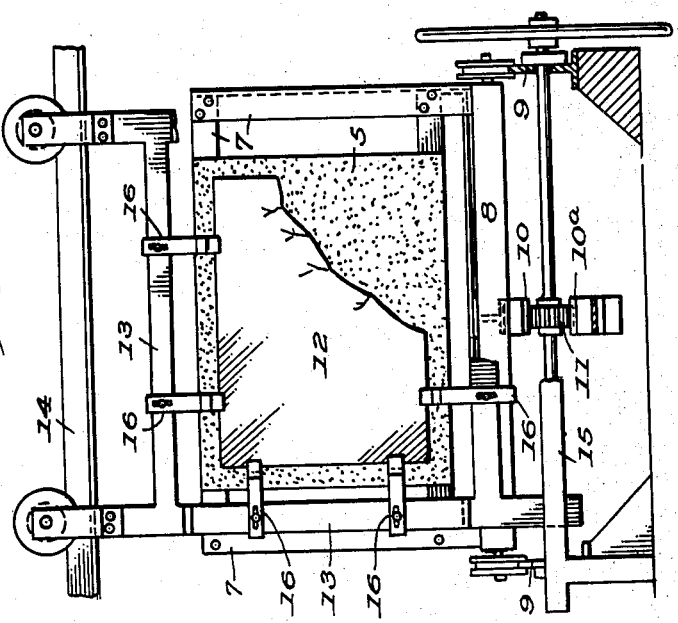
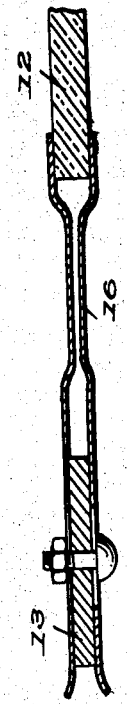
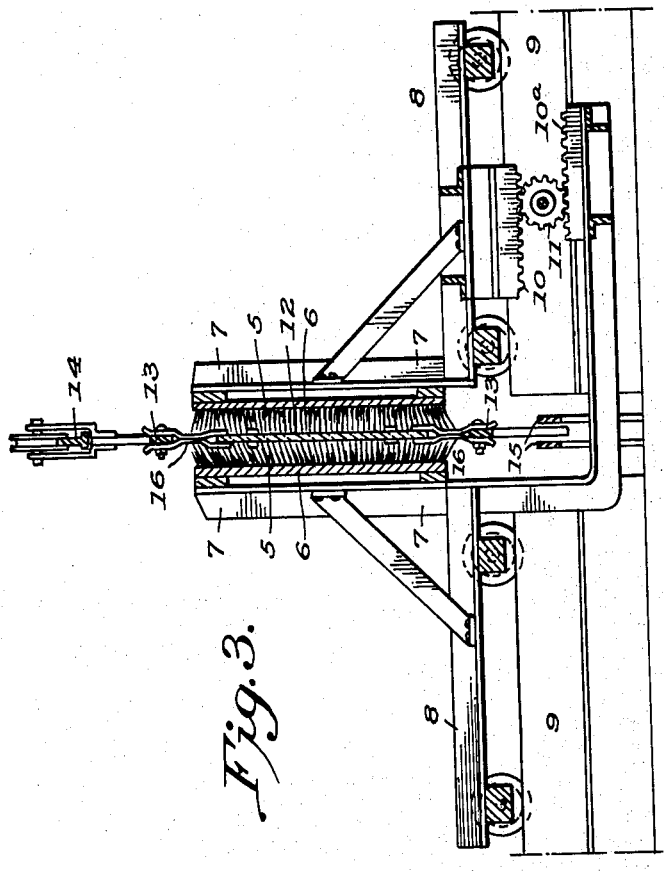
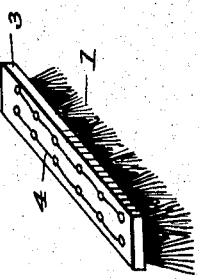
Inventor
BERNARD LONG Sept. 27, 1938. B. LONG 2,131,404
METHOD AND APPARATUS FOR TEMPERING GLASS
Filed April 8, 1936 3 Sheets-Sheet 2
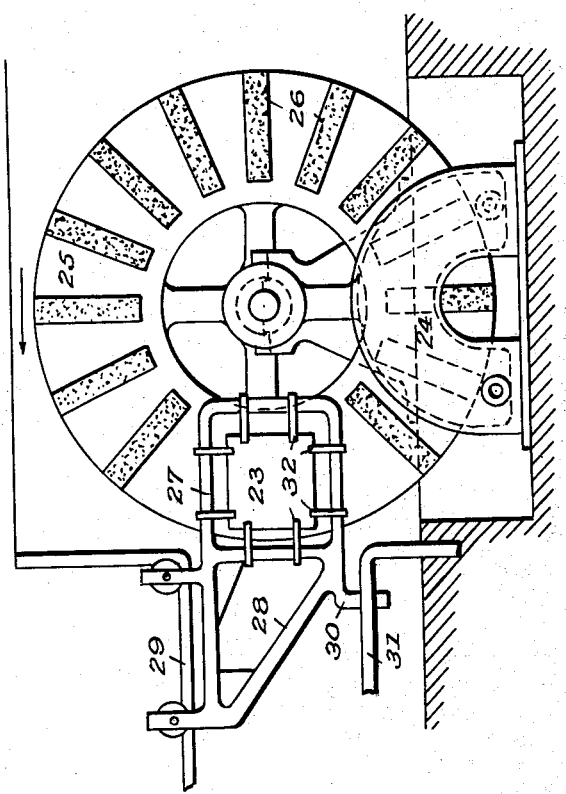
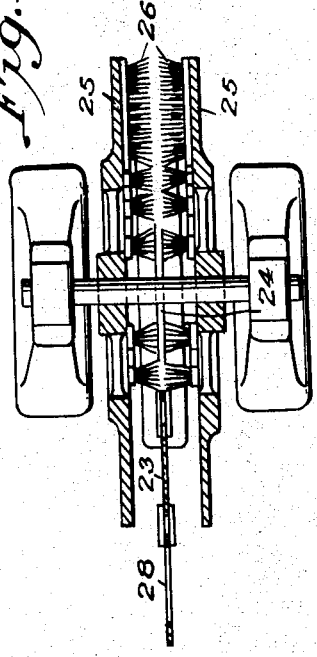
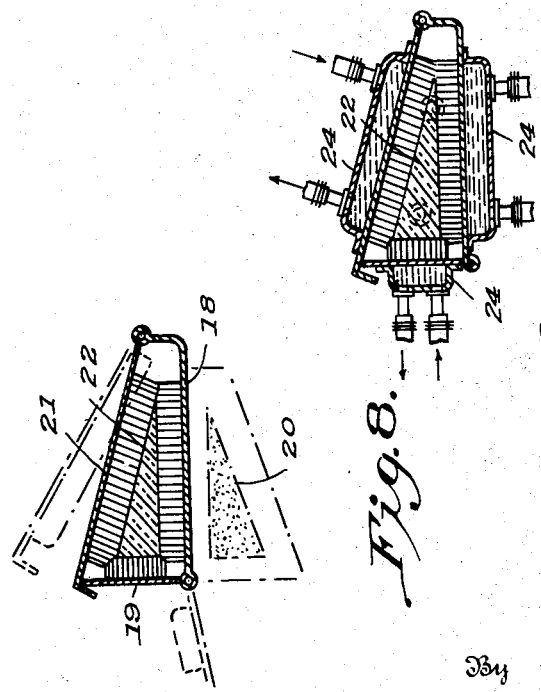
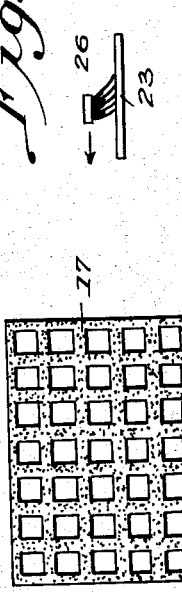
Inventor
BERNARD LONG
By
Attorneys

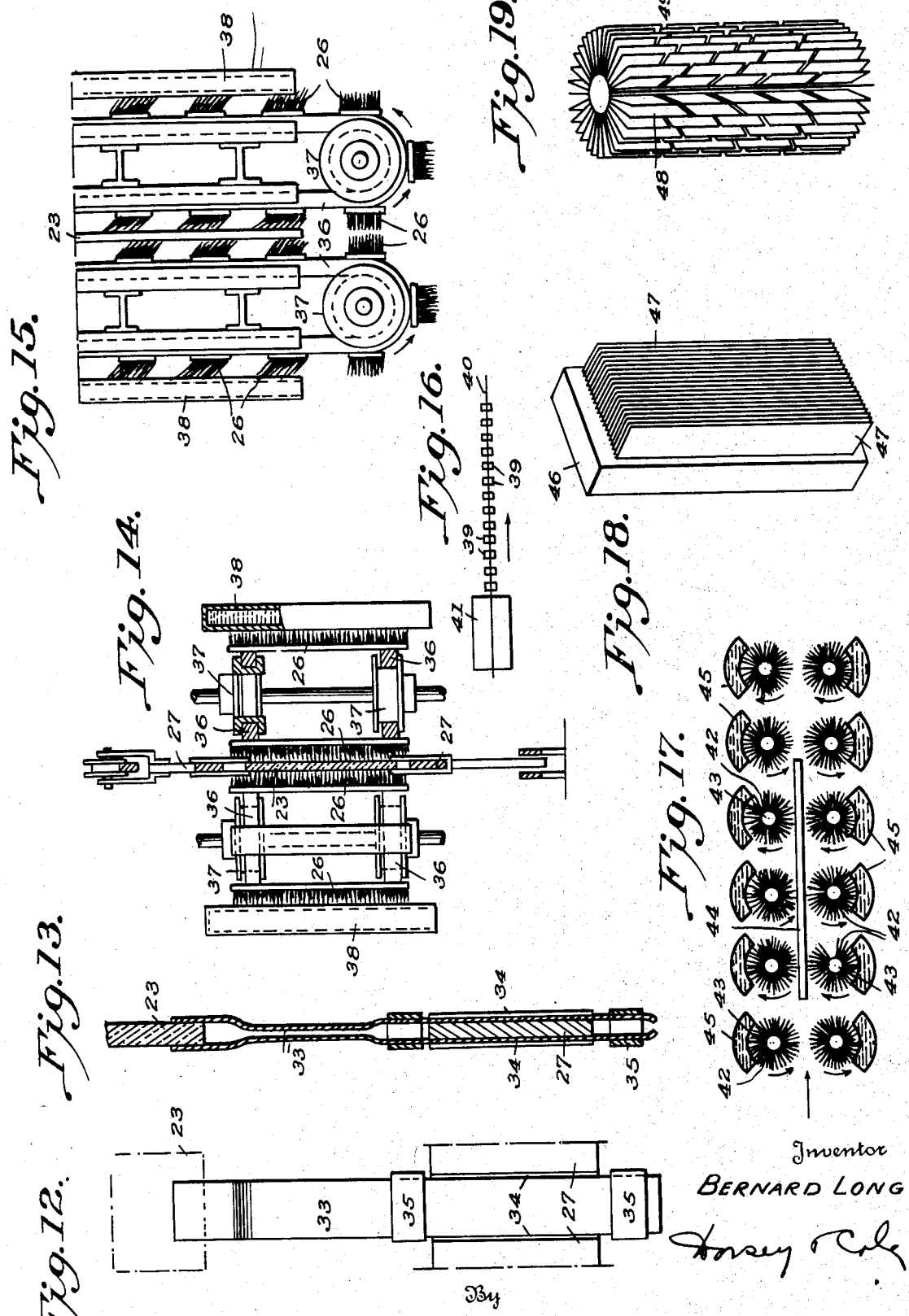

Patented Sept. 27, 1938

2,131,404

UNITED STATES PATENT OFFICE 2,131,404

METHOD AND APPARATUS FOR TEMPERING GLASS

Bernard Long, Paris, France, assignor to The American Securit Company, Washington, D. C., a corporation of Delaware Application April 8, 1936, Serial No. 73,353
In France April 10, 1935

43 Claims. (Cl. 49—45)

This invention relates to a new process for producing sudden cooling of glass in order to temper it.

As is well known, the tempering of glass articles consists in heating these articles to a temperature approximating their softening point and in subjecting them in this condition to a sudden cooling. This thermal treatment gives to the articles special mechanical properties, particularly an increase of resistance, hardness and toughness; it also determines, in case of breakage of the article a mode of particular fragmentation, in small harmless pieces.

But these results are however obtained only if the heating and consecutive cooling have been effected in well defined conditions. These conditions can vary from one article to the other; in some cases, the thermal actions must be absolutely uniform through the surface of the article; in other cases they must on the contrary be reinforced in certain zones, either because the article presents variations in its thickness, or for any other reason. But, generally speaking, it is necessary that either the action of the heating agent, or that of the cooling may be controlled and distributed at will.

In the tempering processes employed up to now, the exact and desired distribution of the cooling effects are obtained with difficulty. In fact, the known processes consist either in immersing the article in a liquid bath, or in pressing it between two metal plates cooled or not by circulation of water, or in subjecting it to the action of a gaseous fluid, such as air or water vapour.

With the liquid bath, the distribution of the cooling is controlled with difficulty; thus, it is practically impossible to localize the cooling in certain zones.

With metal plates, it is impossible to simultaneously ensure for all the points of the plates a satisfactory contact with the glass, unless these plates are firmly pressed on the article, but, in this case, the surface of the latter is spoiled.

The air blowing process has the advantage of not spoiling the surface, but it necessitates the use of a voluminous supply of air and involves movements of fluid in considerable volumes which are sometimes difficult to control and to direct at will. Thus, the air which has struck the article at one place rebounds towards the adjacent parts and can interfere to a certain extent with the action of the blowing on the latter.

The present invention remedies these inconveniences. It allows of suddenly cooling the glass articles, without spoiling their surface, by permitting to effect the cooling according to any desired distribution.

The invention consists in cooling the articles by bringing in contact therewith brushes provided with very flexible metallic elements which are capable of being placed in resilient contact with the glass surface such as fine wires, or thin metal blades. In fact, I have discovered that flexible metallic elements satisfying certain conditions concerning the nature of the metal, the fineness and the length, grouped in such a manner that their ends form, in the same way as brushes or mats, real surfaces and taken at a sufficiently low temperature, such for instance as ordinary temperature, caused by their contact with the glass a cooling sufficient for tempering the latter.

I have found that, if the metallic element is relatively thin, the contact of the brushes thus constituted do not spoil the surface of the glass although this contact is exerted on surfaces having a temperature approximating the softening point, and that it is effected with a certain pressure against these surfaces. In this operation, the metallic elements yield, this allowing the brushes to conform to all the small unevennesses of the surface of the articles. On the other hand, it is not indispensable that the brushes should be cut according to surfaces exactly similar to those of the articles, as the slight unevenneses which may exist in the brushes disappear at the time of contact owing to the corresponding yielding of the metallic elements to a greater or less extent.

The invention allows of distributing the cooling at will, in particular of exerting it in certain zones or regions and not in others, or of exerting a more or less intense action according to the regions. For that purpose, it is possible to act on the density of distribution of the metallic elements such as the wires or the blades, on their thickness or diameter, on the nature of the metal constituting them and even on their length, or to combine these various means.

In any case, the action on a zone has not any reaction on the adjacent zones; each brush element, constituted in a definite manner, operates individually.

The contact between the brushes and the glass to be tempered can be obtained in different manners, either by simply applying these brushes on the glass by a movement directed at right angles to the surfaces of the glass article, or by moving them on these surfaces so as to produce a kind of sweeping action, or by combining these means.

In some cases, the metallic mass constituted by the metallic elements and the mounting or stock of the brushes is sufficient for absorbing all the heat it is desired to remove from the glass. In other cases, it is necessary to evacuate it outside the brushes. For that purpose, the invention provides that the mountings or stock of the latter can be provided with boxes in which cooling fluids circulate. It also provides that the brushes can, during the tempering operatoin, in case these brushes are movable, pass in enclosures, or in contact with surfaces to which they yield the heat taken from the glass.

Various forms of carrying out the invention are illustrated, by way of example only, in the accompanying drawings in which:

Fig. 1 is a perspective view and Fig. 2 a cross section showing a wire brush for carrying out the new process.

Fig. 3 is an elevation, partly in section, and Fig. 4 a corresponding side view showing a machine for carrying out the process.

Fig. 5 is a detail section made on an enlarged scale.

Fig. 6 is a diagrammatic view showing a special application of the new process.

Fig. 7 is a sectional view showing a device for another application.

Fig. 8 is a modification of this device.

Fig. 9 is a vertical section and Fig. 10 a corresponding horizontal section of another machine.

Fig. 11 illustrates a brush of this machine in operation.

Figs. 12 and 13 are two corresponding views in elevation and longitudinal section of tongs of this machine.

Fig. 14 is an end view, partly in section, and Fig. 15 a corresponding plan view of a modification of the machine.

Fig. 16 is a diagrammatic plan view showing another form of carrying out the invention.

Fig. 17 is a horizontal section of a constructional modification of the machine.

Fig. 18 is a perspective view of a plane brush provided with thin metal blades.

Fig. 19 is a view of a cylindrical brush provided with thin metal blades.

As illustrated in the drawings, the sudden cooling intended to produce tempering is obtained by means of brushes such as those shown in Figs. 1 and 2. These brushes are similar to ordinary brushes, but they are provided with fine and closely arranged metallic hair or bristles, made of a metal which is a good conductor of heat.

These bristles can be constituted for instance by brass, red copper, silver or like wires having a diameter of a few hundredths of a millimeter and having a length of a few centimeters.

Said bristles can be arranged in tufts 1, fitted into recesses 2 of the mounting or stock 3, and held by bonds 4, as in ordinary brushes, but any other mode of construction of the brushes suited to the nature of the bristles and to the use for which these brushes are intended can be adopted.

The surface formed by the ends of the bristles is made level according to a plane parallel to the mounting, or shaped according to any surface. It can present bulged portions and hollows obtained by means of bristles of suitable length.

The mounting is preferably made of a metal which is a good conductor of heat. It can have any desired shape, and be made in one piece or in a plurality of juxtaposed pieces. It can be sufficiently wide in order that these brushes may form real wire-mats, capable of covering the entire surface of the article to be tempered.

Figs. 3 and 4 illustrate a form of construction in which two wire-mats are simultaneously applied on both faces of a sheet to be tempered by covering the entire surface of the latter, the cooling being obtained by simple application of the bristles, without displacement of the latter at the surface of the sheets.

The brushes 5 are carried by mountings 6 secured on vertical frames 7 rigid with carriages 8, rolling on rails 9. These carriages are provided with racks 10 and 10ª, meshing with a single pinion 11 which actuates them in reverse direction. By acting on this pinion by means of a crank or of a hand wheel, the two brushes can be simultaneously moved towards the glass sheet 12 to be tempered or they can be moved away therefrom. This movement of the brushes can be produced by hand or mechanically. In any case, it is useful to be able to control the pressure exerted on the glass by the two mats; this result can be obtained by means of devices limiting or controlling the stress exerted by hand or mechanically.

The glass sheet 12 is carried by a frame 13, rolling on a guide rail 14 and fitting at its base between guide strips 15 preventing any displacement of the frame at right angles to the faces of the glass. The glass sheet is held by means of tongs 16 which are shown separately in Fig. 5. These tongs are, on the one hand, made of thin metal which is a good conductor of heat and, on the other hand, they are fitted up in such a manner as to clamp the glass sheet and to be in intimate contact with the same. In this way, holding members are obtained which do not interfere with the density of distribution of the bristles and transmit to the glass the cooling action of these bristles without practically modifying it The distribution of the brushes which is shown in Figs. 3 and 4 is uniform and produces a uniform cooling of the glass sheet treated. For other applications, it may be necessary, on the contrary, to obtain a tempering localized or reinforced in certain regions or zones of the glass article. Thus, for instance, in wind-shields for motor cars, it has been found advantageous to temper certain zones less than others, or not to temper them, so that in the case of breakage, there are certain portions of the glass sheet which do not break into very small pieces and continue to ensure visibility through the windshield. Fig. 6 shows a mat 17, in which the wires intended to produce the cooling of the glass sheet form a chequer-work. The portions of the glass with which the metallic bristles comes in contact are tempered, whilst the others, which constitute zones surrounded by the first ones, are not tempered.

If it is desired to obtain a certain degree of tempering in the surrounded zones, use is made of a continuous mat, but in which the density of distribution of the wires or its conductibility is smaller for the surrounded zones than for the surrounding zones.

For producing these special temperings, two mats of the type of those just described, are applied on both faces of the glass sheet, by means of a machine similar to that illustrated in Figs. 3 and 4.

Another application of the principle of the invention is that in which one and the same glass article is tempered in a different manner in its various portions, and the tempering can vary more or less progressively from one point to the other. This is the case for glass paving-blocks of variable thickness, for instance for those having a triangular section, as illustrated in Fig. 7. In such articles, the portions of smaller thickness must be subjected to a tempering different from that of the thick portions.

Fig. 7 shows a box for tempering these triangular paving-blocks.

This box, having a fixed bottom 18, is provided with a front wall 19, side walls 20 and a top 21 which are pivoted together as clearly shown in the drawings, and can be folded outwardly so as to completely open the box and to allow the insertion of a paving-block 22. All these walls are lined with metallic bristles, but the latter are so made as to procure different cooling effects in the different portions of the paving-block 22. Thus, for instance, if they are all of the same nature, diameter and length, they can be more numerous per unit of surface near the thin portions, such as the angles. The brushes illustrated in Fig. 7 diagrammatically show a distribution of the bristles in accordance with this principle.

When the box is closed, but empty, the free inner space has a volume less than that of the glass article, so that when the latter is placed in the box, the bristles produce a certain pressure on the glass by slightly flattening.

For accelerating cooling, some of the walls can be provided with chambers 24, Fig. 8, in which is produced a circulation of a cooling fluid, water for instance.

For localizing the tempering effects, the above chambers 24 can be divided into compartments in which different circulations are produced.

In all the foregoing applications, the brushes are moved against the glass, then, after having fulfilled their action, they are moved away.

Other applications will now be described, in which the brushes receive a relative movement relatively to the tempered articles.

In the machine shown in Figs. 9 and 10, a glass sheet 23 is treated by means of two similar rotary discs 25, each carrying a series of metallic brushes 26. Each brush, during the circular movement, successively acts on the glass sheet by sweeping over the same. Fig. 11 shows one of the brushes passing over the glass sheet, its bristles being slightly flattened owing to the movement.

The brushes also pass in contact with a cooling surface 24 constituted by a thin water jacket, having a thickness approximating that of the glass plate, and to which they yield the heat they have removed from the glass plate.

For allowing to easily insert between the discs the member to be treated, a portion of the periphery of said discs need not be provided with brushes. The glass sheet is inserted when the discs are stationary and when they occupy the position illustrated in Fig. 9. Once the glass sheet is placed in position, the discs are started.

The glass plate or sheet is carried by a frame 27 rigid with a carriage 28, rolling on a guide rail 29. An arm 30, fitted between guide bars 31, prevents any side displacement of the carriage during the operation.

As the brushes pass on the tongs 32 holding the glass plate, these tongs must have a minimum thickness. Figs. 12 and 13 illustrate in detail, one of these tongs. They are each constituted by two small flexible plates 33 separated from each other and fitting into recesses 34 of the frame 27. Staples or rings 35 allow of holding these small plates in position.

Owing to this arrangement, a securing device capable of being taken to pieces is obtained which does not present any projecting parts and on which the brushes can pass without difficulty.

The system shown in Figs. 9–10 produces a constant cooling action, as the water jacket 24 ensures the cooling of the brushes at each revolution.

Instead of being carried by discs, as just described, the brushes can be carried by endless chains, so that, during contact with the glass sheet, the brushes move parallel to themselves, Figs. 14 and 15 illustrating an example of this arrangement. The brushes 26 are secured on chains 36 passing over drums 37. The glass sheet 23 to be treated is hung in the same way as in the preceding machine. The cooling water jackets are arranged at 38 on the outer path followed by the brushes.

Another mode of ensuring the relative displacements of the brushes relatively to the glass sheets consists, for instance, in arranging two rows of fixed brushes between which the glass sheets are moved with a continuous movement. Fig. 16 diagrammatically shows an arrangement of this kind; 39 designates brushes, 40 designates a horizontal rail on which rolls the carriage which brings the sheet from the furnace 41 up to the end of the rows of brushes. The latter are stationary and the surface of the glass sheet is swept owing to the continuous displacement of the carriage. The cooling of the brushes can be effected by causing to pass, in the place and stead of the glass sheets, plates of cold metal, or by causing water to circulate in the mountings of the brushes.

Another embodiment consists in causing the glass sheets to move between rows of brushes having surfaces of revolution and tangent to the glass sheet, the axes of these surfaces of revolution remaining fixed, and the brushes receiving a continuous movement of rotation about said axes. This movement can be directed either in the direction of advance of the glass sheet, or in the reverse direction; the direction can also be alternated by passing from one brush to the other. Fig. 17 shows a portion of an apparatus of this kind in which: 42 designates cylindrical brushes rotating about their vertically arranged shafts 43. The glass sheet 44 moves tangentially to these cylinders. In this figure, it has been assumed that the direction of rotation is reversed from one brush to the other.

The cooling of the brushes is effected by means of jackets 45 in which water circulates and constituted by portions of cylinders, partially surrounding the brushes and in contact with the latter.

As shown in Fig. 18 the brushes may be constituted by a mounting or stock 46 and by very thin metal blades 47. Such brushes may be used on the hereinabove described apparatus and particularly on those represented by Figures 9 and 10, or 14 and 15.

The distribution of the blades, the nature of the metal and their dimensions may be differentiated as in wire brushes in accordance with the cooling to obtain.

Further Fig. 19 shows a cylindrical brush constituted by thin metal blades 48 which may be divided along the length of the brush in several parts 49.

Such brushes may be substituted to wire brushes of the Figure 17.

Generally speaking, the invention is not necessarily carried out by a cooling exclusively obtained by means of brushes. It can also be carried out by combining the action of the brushes with that of other means, particularly that of jets of fluids, such as air, produced by suction or by blowing.

Thus, in the case of Fig. 6 for instance, the cooling of the zones surrounded by the brushes can be obtained by means of air blown against these zones. In such a combination, the brushes have not only for effect to ensure the cooling of the zones with which they are in contact, but, also, of constituting a kind of cellular construction within the cavities of which is exerted the action of the fluid jets, the effect of which is thus perfectly localized on the zones left uncovered by the brushes.

In other combinations, on the contrary, the action of the air can be combined with that of the brushes, the air blowing being, in this case, effected in the very midst of the tufts of the bristles of the brushes. In these conditions, the air acts in two manners: by its direct action on the glass article and by its cooling action on the bristles themselves.

Moreover, the action of the brushes and that of the fluids can be exerted simultaneously or successively.

The arrangements described above are given by way of example only; all the details of construction, the shapes, dimensions and materials used can be varied according to circumstances without departing thereby from the scope of the invention.

I claim:

1. A method for the tempering of glass articles previously heated to the softening point which consists in absorbing heat from the surface to be cooled by the contact therewith of brushes constituted by metallic flexible elements.

2. A method for the tempering of glass articles previously heated to the softening point which consists in cooling the glass surface by means of brushes constituted by metallic flexible elements by bringing such brushes in resilient contact with said glass surface.

3. A method for the tempering of glass articles previously heated to the softening point which consists in moving brushes constituted by metallic flexible elements towards the surfaces to be cooled and in leaving them in contact with said surfaces during the necessary time.

4. A method for the tempering of glass articles previously heated to the softening point which consists in bringing brushes constituted by metallic flexible elements in contact with the glass surfaces to be cooled and in moving said brushes while in contact with the glass by imparting a relative displacement to said brushes and said glass surfaces.

5. A method for the tempering of glass articles previously heated to the softening point which consists in cooling the glass surfaces by the contact with brushes constituted by metallic flexible elements, said cooling being associated with the action of jets of a fluid cooling medium.

6. A method for the tempering of glass articles previously heated to the softening point which consists in using the contact of brushes constituted by metallic flexible elements and the action of a fluid cooling medium to act on respectively different areas of the surfaces to be cooled.

7. A method for the tempering of glass articles previously heated to the softening point which consists in combining the cooling action of brushes constituted by metallic flexible elements with that of a fluid cooling medium, both actions being simultaneous.

8. A method for the tempering of glass articles previously heated to the softening point which consists in combining the cooling action of brushes constituted by metallic flexible elements with that of a fluid cooling medium, both actions being successive.

9. A method for the tempering of glass articles previously heated to the softening point which consists in combining the cooling action of brushes constituted by metallic flexible elements with that of a fluid cooling medium, both actions being juxtaposed.

10. A method for the tempering of glass articles previously heated to the softening point which consists in combining the cooling action of brushes constituted by metallic flexible elements with that of a fluid cooling medium, both actions being superposed.

11. A method for the tempering of glass articles previously heated to the softening point which consists in absorbing heat from the surface to be cooled by the contact therewith of brushes constituted by metallic flexible elements, the brushes being cooled.

12. A method for the tempering of glass articles previously heated to the softening point which consists in absorbing heat from the surface to be cooled by the contact therewith of brushes constituted by metallic flexible elements, the brushes being cooled by circulation of a cooling medium through their mountings or stocks.

13. A method for the tempering of glass articles previously heated to the softening point which consists in absorbing heat from the surface to be cooled by the contact therewith of brushes constituted by metallic flexible elements, the brushes being cooled by contact with a cooling surface.

14. An apparatus for the tempering of glass articles comprising frames which carry brushes constituted by metallic bristles, a movable support to position the glass article between said frames, and means for adjusting the frames towards the glass article and holding the brushes in resilient contact therewith.

15. An apparatus for the tempering of glass articles comprising frames which carry brushes constituted by thin metallic blades, a movable support to position the glass article between said frames, and means for adjusting the frames towards the glass article and holding the brushes in resilient contact therewith.

16. An apparatus for the tempering of glass articles comprising frames which carry wire-mats having a surface corresponding to that of the article, a movable support to position the glass article between said frames, and means for adjusting the frames towards the glass article and holding the wire-mats in resilient contact therewith.

17. An apparatus for the tempering of glass articles comprising frames which carry wire-brushes having a surface corresponding to that of the article, the distribution of the wires which are all similar being uniform in each brush, a movable support to position the glass article between said frames, and means for adjusting the frames towards the glass article and holding the wire-brushes in resilient contact therewith.

18. An apparatus for the tempering of glass articles comprising brush carrying frames, wire-brushes constituted by metallic bristles grouped according to a predetermined design, a movable support to position the glass article between said frames, and means for adjusting the frames towards the glass article and holding the brushes in resilient contact therewith.

19. An apparatus for the tempering of glass articles comprising brush carrying frames, wire-brushes having a differential distribution of the wires in accordance with the magnitude of the cooling to be effected on each point of the glass surface, a movable support to position the glass article between said frames, and means for adjusting the frames towards the glass article and holding the brushes in resilient contact therewith.

20. An apparatus for the tempering of glass articles comprising brush carrying frames, brushes with wires of different metals arranged in accordance with the magnitude of the cooling to be effected on each point of the glass surface, a movable support to position the glass article between said frames, and means for adjusting the frames towards the glass article and holding the brushes in resilient contact therewith.

21. An apparatus for the tempering of glass articles comprising frames which carry brushes constituted by metallic bristles, a movable support to position the glass article between said frames, and means for adjusting the frames towards the glass article and holding the brushes in resilient contact therewith and means for cooling the brushes.

22. An apparatus for the tempering of glass articles comprising frames which carry brushes constituted by metallic bristles, a movable support to position the glass article between said frames, and means for adjusting the frames towards the glass article and holding the brushes in resilient contact therewith, and means for circulating a cooling fluid in the brush stocks.

23. An apparatus for the tempering of glass articles comprising frames which carry brushes constituted by thin metallic blades, a movable support to position the glass article between said frames, means for adjusting the frames towards the glass article and holding the brushes in resilient contact therewith, and means for circulating a cooling fluid in the brush stocks.

24. An apparatus for tempering glass articles comprising frames which carry brushes constituted by metallic bristles, a movable support to position the glass article between said frames, means for adjusting the frames towards the glass article and holding the brushes in resilient contact therewith, and means to impart a relative movement between the glass article and the brushes.

25. An apparatus for tempering glass articles comprising frames, which carry brushes constituted by thin metallic blades, a movable support to position the glass article between said frames, means for adjusting the frames towards the glass article and holding the brushes in resilient contact therewith, and means to impart a relative movement between the glass article and the brushes.

26. Apparatus for tempering glass sheets or plates which comprises a sheet support adjustable in position between two series of brushes constituted by flexible metallic elements and mounted on rotatable discs and adapted to move on respectively opposite sides of the glass sheet while in resilient contact therewith.

27. Apparatus for tempering glass sheets or plates which comprises a sheet support adjustable in position between two series of brushes constituted by flexible metallic elements and mounted on rotatable discs and adapted to move on respectively opposite sides of the glass sheet while in resilient contact therewith and means for cooling the metallic bristles by contact with a cooling member.

28. Apparatus for tempering glass sheets or plates which comprises a sheet support adjustable in position between two series of brushes constituted by flexible metallic elements mounted on endless chains and adapted to move on respectively opposite sides of the glass sheet while in resilient contact therewith.

29. An apparatus for the tempering of glass sheets or plates comprising grippers to hold the glass sheet in the form of thin plates of metal of high thermal conductivity, a pair of frames carrying brushes constituted by flexible metallic elements to bring the brushes into contact with both faces of the glass sheet.

30. Apparatus for tempering glass sheets or plates comprising a member arranged to support a glass sheet, brushes constituted by flexible metallic elements arranged in two series on opposite sides of the sheet for resilient contact with said sheet, and means for moving relatively said member and said brushes.

31. Apparatus for tempering glass sheets or plates comprising a member arranged to support a glass sheet, brushes constituted by flexible metallic elements arranged in two series on opposite sides of the sheet for resilient contact with said sheet, means for rotating the brushes, and means for moving the member to carry the glass sheet past said brushes.

32. Apparatus for the tempering of glass articles comprising a box having walls which support flexible metallic elements on opposite sides of a glass article, and means for moving said walls relatively to bring said elements into and out of contact with said article.

33. Apparatus for the tempering of glass articles comprising a box having walls which support flexible metallic elements on opposite sides of a glass article, means for moving said walls relatively to bring said elements into and out of contact with said article, and means for positively cooling said elements.

34. Apparatus for the tempering of a glass article which comprises a support for a glass article and brushes constituted by flexible metallic elements to cool the surfaces of said article by contact with said surfaces, the density or grouping of the metallic elements varying from one point to the other of the brushes in accordance with the cooling action to obtain at determined points of the glass surfaces.

35. Apparatus for the tempering of a glass article which comprises a support for a glass article and brushes constituted by flexible metallic elements to cool the surfaces of said article by contact with said surfaces, the kind of metal constituting the metallic elements of the brushes being different from one point to the other of the brush in accordance with the cooling action to obtain at determined points of the glass surfaces.

36. Apparatus for the tempering of a glass article which comprises a support for a glass article and brushes constituted by flexible metallic elements to cool the surfaces of said article by contact with said surfaces, the dimensions of the metallic elements of the brushes being different from one point to the other of the brushes in accordance with the cooling action to obtain at determined points on the glass surface.

37. A method for the tempering of glass articles previously heated to the softening point which permits the production of a tempering localized to certain zones of the glass articles, by using brushes constituted by flexible metallic elements which come into contact with the glass surfaces and by adjusting the shape of said brushes to the shape of the zones to be tempered.

38. Apparatus for the tempering of a glass article which permits the production of a tempering localized to certain zones of the glass article and which comprises a support for a glass article and brushes to cool the article by contact therewith which are constituted by flexible metallic elements grouped according to the shape of the above mentioned zones.

39. Apparatus for tempering glass sheets or plates which comprises a conveyor to carry a glass sheet, two series of brushes constituted by flexible metallic elements on both sides of the path followed by the glass sheet and adapted to come into a resilient contact with said sheet.

40. Apparatus for tempering glass sheets or plates which comprises a conveyor to carry a glass sheet, two series of brushes constituted by flexible metallic elements on both sides of the path followed by the glass sheet, said brushes being rotatable around fixed axes.

41. An apparatus for the tempering of glass articles comprising a box having its inner walls provided with flexible metallic elements and being adapted to open in order to receive and enclose the glass article to be tempered, such metallic elements being adapted to come in contact with the surfaces of the glass article, while the box is closed.

42. An apparatus for the tempering of glass articles comprising a box having its inner walls provided with flexible metallic elements and being adapted to open in order to receive and enclose the glass article to be tempered, the walls of the box carrying also cooling jackets, such metallic elements being adapted to come in contact with the surfaces of the glass article while the box is closed.

43. A method for the tempering of glass articles previously heated to the softening point in order to produce a desired differential cooling at the different parts of the glass surfaces which consists in absorbing heat from the surface to be cooled by the contact therewith of brushes constituted by metallic flexible elements having a cooling action which is different from one part to the other.

BERNARD LONG.